United States Patent
Heo et al.

(10) Patent No.: US 9,823,337 B2
(45) Date of Patent: Nov. 21, 2017

(54) APPARATUS AND METHOD FOR CONTROLLING ALIGNMENT OF VEHICLE RADAR

(71) Applicant: MANDO CORPORATION, Pyeongtaek-si, Gyeonggi-do (KR)

(72) Inventors: Sung Joon Heo, Gyeonggi-do (KR); Su Han Kim, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 227 days.

(21) Appl. No.: 14/745,890

(22) Filed: Jun. 22, 2015

(65) Prior Publication Data

US 2015/0369904 A1 Dec. 24, 2015

(30) Foreign Application Priority Data

Jun. 20, 2014 (KR) .................. 10-2014-0075806

(51) Int. Cl.
*G01S 7/40* (2006.01)
*G01S 13/93* (2006.01)

(52) U.S. Cl.
CPC ....... *G01S 7/4026* (2013.01); *G01S 2007/403* (2013.01); *G01S 2007/4034* (2013.01)

(58) Field of Classification Search
CPC . G01S 7/02; G01S 7/40; G01S 7/4004; G01S 7/4026; G01S 2007/403; G01S 2007/4034; G01S 7/4017; G01S 7/4021; G01R 29/08; G01R 29/10
See application file for complete search history.

(56) References Cited

U.S. PATENT DOCUMENTS

| | | | | |
|---|---|---|---|---|
| 3,170,156 A | * | 2/1965 | Downs | G01S 7/4021 342/173 |
| 3,221,328 A | * | 11/1965 | Isch | G01S 7/4021 342/151 |
| 4,531,126 A | * | 7/1985 | Sadones | G01R 29/10 340/13.37 |
| 5,003,314 A | * | 3/1991 | Berkowitz | G01S 7/4017 342/174 |
| 6,714,156 B1 | * | 3/2004 | Ibrahim | G01S 7/4026 342/165 |
| 2009/0109085 A1 | * | 4/2009 | Needham | G01S 7/4021 342/174 |

* cited by examiner

Primary Examiner — Bernarr E Gregory
(74) Attorney, Agent, or Firm — Hauptman Ham, LLP

(57) ABSTRACT

The present invention relates to an apparatus and a method for controlling an alignment of a vehicle radar capable of automatically detecting a vertical angle of a target to perform an alignment in a vertical direction. The apparatus includes: a substrate; a transmitting antenna unit configured to be disposed at one side of the substrate; a receiving antenna unit configured to be disposed at the other side of the substrate; and a vertical angle detection unit configured to detect a vertical angle of a target based on a signal received from the receiving antenna unit, wherein the receiving antenna unit includes: a plurality of first antennas configured to be arranged in a row direction to a surface of the substrate; and a plurality of second antennas configured to be arranged in a column direction to the surface of the substrate.

14 Claims, 7 Drawing Sheets

APPARATUS AND METHOD FOR CONTROLLING ALIGNMENT OF VEHICLE RADAR

CROSS REFERENCE TO RELATED APPLICATION

This application claims the priority of Korean Patent Application No. 10-2014-0075806, filed on Jun. 20, 2014 in the KIPO (Korean Intellectual Property Office) which designates the United States and was published in Korean.

BACKGROUND OF THE INVENTION

Field of the Invention

Exemplary embodiments of the present invention relate to a vehicle radar, and more particularly, to an apparatus and a method for controlling an alignment of a vehicle radar capable of automatically detecting a vertical angle of a target to perform an alignment in a vertical direction.

Description of the Related Art

Generally, an adaptive cruise control (ACC) system of a vehicle is a system which automatically controls a throttle valve, a brake, a transmission, etc., based on a position and a distance of a preceding vehicle detected by a radar mounted at a front of a vehicle to perform appropriate acceleration and deceleration, to thereby maintain an optimum distance from a preceding vehicle.

In the adaptive cruise control system of a vehicle, the radar is mounted in a front end module of a vehicle to detect a position and a distance of a preceding vehicle, and therefore an alignment for radar directivity and analysis on analysis coordinate values may be important factors in the adaptive cruise control system.

However, when a misalignment of a radar may occur in a vertical direction to a ground among directivities of the radar mounted in a vehicle, the related art has used a motor, manual methods such as a method of adjusting a screw mounted in a bracket, or the like to adjust the vertical alignment.

For example, a worker operates the motor to adjust a vertical directional angle of an antenna beam of a radar or adjusts the screw mounted in the bracket to adjust the vertical directional angle of the antenna beam of the radar.

However, these manual methods have an ineffective problem in cost or mass production.

SUMMARY OF THE INVENTION

An object of the present invention relates to provide an apparatus and a method for controlling an alignment of a vehicle radar capable of automatically performing a vertical alignment by vertically arranging a plurality of antennas in a vertical direction simultaneously with horizontally arranging the antennas in a horizontal direction to automatically detect a vertical angle of a target.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, an apparatus for controlling an alignment of a vehicle radar includes: a substrate; a transmitting antenna unit configured to be disposed at one side of the substrate; a receiving antenna unit configured to be disposed at the other side of the substrate; and a vertical angle detection unit configured to detect a vertical angle of a target based on a signal received from the receiving antenna unit, wherein the receiving antenna unit includes: a plurality of first antennas configured to be arranged in a row direction to a surface of the substrate; and a plurality of second antennas configured to be arranged in a column direction to the surface of the substrate.

The first antennas may be arranged in the row direction in parallel, having a first interval and the second antennas may be arranged in the column direction in parallel, having a second interval.

The vertical angle detection unit may include: a phase value calculator configured to calculate the phase values of the signals, which are received from the receiving antenna unit, for each row; a phase difference calculator configured to compare the phase values of the signals for each row which are calculated by the phase value calculator to calculate the phase differences for each row; and a detector configured to detect the vertical angle of the target based on the phase differences calculated by the phase difference calculator.

The vertical angle detection unit may include: a signal strength calculator configured to calculate the strengths of the signals, which are received from the receiving antenna unit, for each row; a first detector configured to compare the strengths of the signals, which are calculated from the signal strength calculator, for each row to detect a row in which the strength of the signal is maximal; and a second detector configured to detect the vertical angle of the target based on the row detected by the first detector.

In accordance with another aspect of the present invention, a method for controlling an alignment of a vehicle radar including a receiving antenna unit includes: receiving signals reflected from a target; calculating phase values of the received signals for each row of the receiving antenna; comparing the calculated phase values of the signals for each row to calculate the phase differences for each row; and detecting a vertical angle of the target based on the calculated phase difference to perform a vertical alignment.

In accordance with still another aspect of the present invention, a method for controlling an alignment of a vehicle radar including a receiving antenna unit includes: receiving signals reflected from a target; calculating strengths of the received signals for each row of the receiving antenna; comparing the strengths of the calculated signals for each row to detect a row in which the strength of the signal is maximal; and detecting a vertical angle of the target based on the detected row to perform a vertical alignment.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Hereinafter, exemplary embodiments of the present invention will be described in more detail with reference to the accompanying drawings.

A module and a unit which are a suffix of components used herein are simply given for the purpose of easy preparation of the present specification and the module and the unit may also be used with being mixed with each other.

Further, exemplary embodiments of the present invention will be described in detail with reference to the accompanying drawings and contents described in the accompanying drawings, but the present invention is not limited to the exemplary embodiments.

Further, the terminologies used in the present specification are selected as general terminologies currently widely used in consideration of the configuration and functions of the present invention, but may be different depending on intention of those skilled in the art, a precedent, appearance of new technologies, and the like. Further, in specific cases, terms arbitrarily selected by an applicant are present. In this case, the detailed meaning of the terms will be described in the description of the present invention. Therefore, terms used in the present specification are defined based on an actual meaning of the terms and contents described in the present specification, not simply based on names of the terms.

Figure 1:
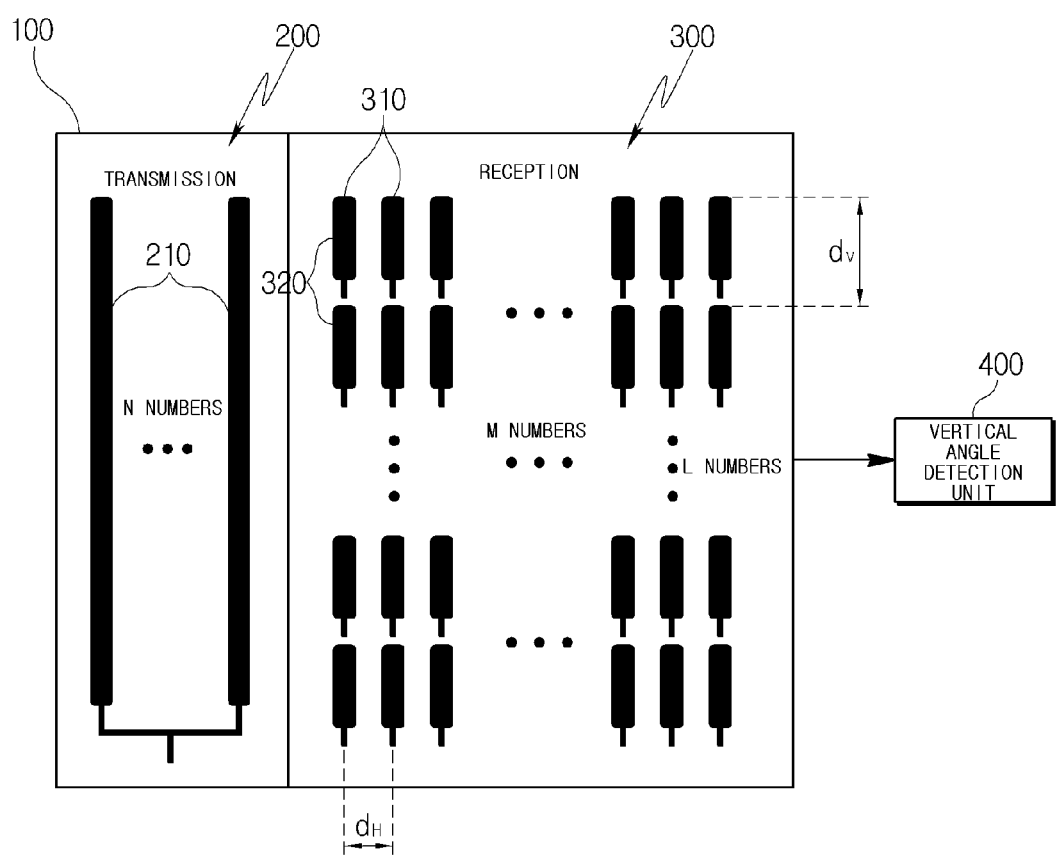
FIG. 1 is a plan view illustrating an apparatus for controlling an alignment of a vehicle radar according to a first exemplary embodiment of the present invention.

FIG. 1 is a plan view illustrating an apparatus for controlling an alignment of a vehicle radar according to a first exemplary embodiment of the present invention.

As illustrated in FIG. 1, the apparatus for controlling an alignment of a vehicle radar according to the first exemplary embodiment of the present invention may include a substrate 100, a transmitting antenna unit 200, a receiving antenna unit 300, and a vertical angle detection unit 400.

In this configuration, the transmitting antenna unit 200 may be disposed at one side of the substrate 100 and the receiving antenna unit 300 may be disposed at the other side of the substrate 100.

Further, the vertical angle detection unit 400 may detect a vertical angle of a target based on a signal received from the receiving antenna unit 300 to perform a vertical alignment.

Next, the receiving antenna unit 300 may include a plurality of first antennas 310 which are arranged in a row direction to a surface of the substrate 100 and a plurality of second antennas 320 arranged in a column direction to the surface of the substrate 100.

In this configuration, the first antennas 310 may be arranged in the row direction in parallel, having a first interval dH.

In this case, the first interval dH may mean a distance between central axes of the first antennas adjacent to each other.

Further, the second antennas 320 may be arranged in a column direction in parallel, having a second interval dV.

In this case, the second interval dV may mean a distance between ends of sides of the second antennas adjacent to each other.

Depending on a method for forming an antenna radiation pattern, the first interval dH between the first antennas 310 and the second interval dV between the second antennas 320 may be different from each other. For example, the first interval dH between the first antennas 310 may be smaller than the second interval dV between the second antennas 320.

As another example, the first interval dH between the first antennas 310 and the second interval dV between the second antennas 320 may be equal to each other.

Further, the first antennas 310 may be arranged in each row in the same number.

For example, when the number of first antennas 310 in a first row is M numbers, the number of first antennas 310 in the rest other rows may be M numbers.

However, depending on the method for forming an antenna radiation pattern, when the number of first antennas 310 in the first row is M numbers, the number of first antennas 310 in the rest other rows may be more or smaller than M numbers.

Further, the second antennas 320 may be arranged in each column in the same number.

For example, when the number of second antennas 320 in a first column is L numbers, the number of second antennas 320 in the rest other columns may be L numbers.

However, depending on the method for forming an antenna radiation pattern, when the number of second antennas 320 in the first column is L numbers, the number of second antennas 320 in the rest other columns may be more or smaller than L numbers.

Meanwhile, the transmitting antenna unit 200 has a plurality of antennas 210 which may be arranged in the row direction to the surface of the substrate 100.

Here, a length of the antenna included in the transmitting antenna unit 200 may be larger than that of the first and second antennas 310 and 320 of the receiving antenna unit 300.

Further, the vertical angle detection unit 400 may calculate phase values of signals received from the receiving antenna unit 300 for each row to obtain phase differences for each row and detects the vertical angle of the target based on the phase differences to perform an alignment.

Figure 2:
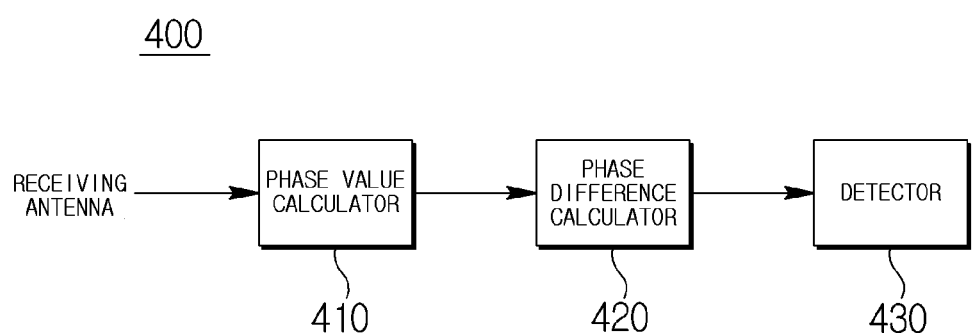
FIG. 2 is a block configuration diagram illustrating a vertical angle detection unit of FIG. 1.

FIG. 2 is a block configuration diagram illustrating a vertical angle detection unit of FIG. 1.

As illustrated in FIG. 2, the vertical angle detection unit 400 may include a phase value calculator 410, a phase difference calculator 420, and a detector 430.

In this configuration, the phase value calculator 410 may calculate the phase values of the signals received from the receiving antenna unit 300 for each row.

Further, the phase difference calculator 420 may compare the phase values of the signals for each row which are calculated by the phase value calculator 410 to calculate the phase differences for each row.

Next, the detector 430 may detect the vertical angle of the target based on a matrix phase difference which is calculated by the phase difference calculator 420.

The vertical angle detection unit of FIG. 1 calculates the phase values of the received signals for each row of the receiving antenna when receiving the signals reflected from the target.

Further, the vertical angle of the target may be easily detected based on the phase differences for each row which are calculated by comparing the calculated phase values of the signals for each row, and as a result the vertical alignment may be automatically performed.

Figure 3:
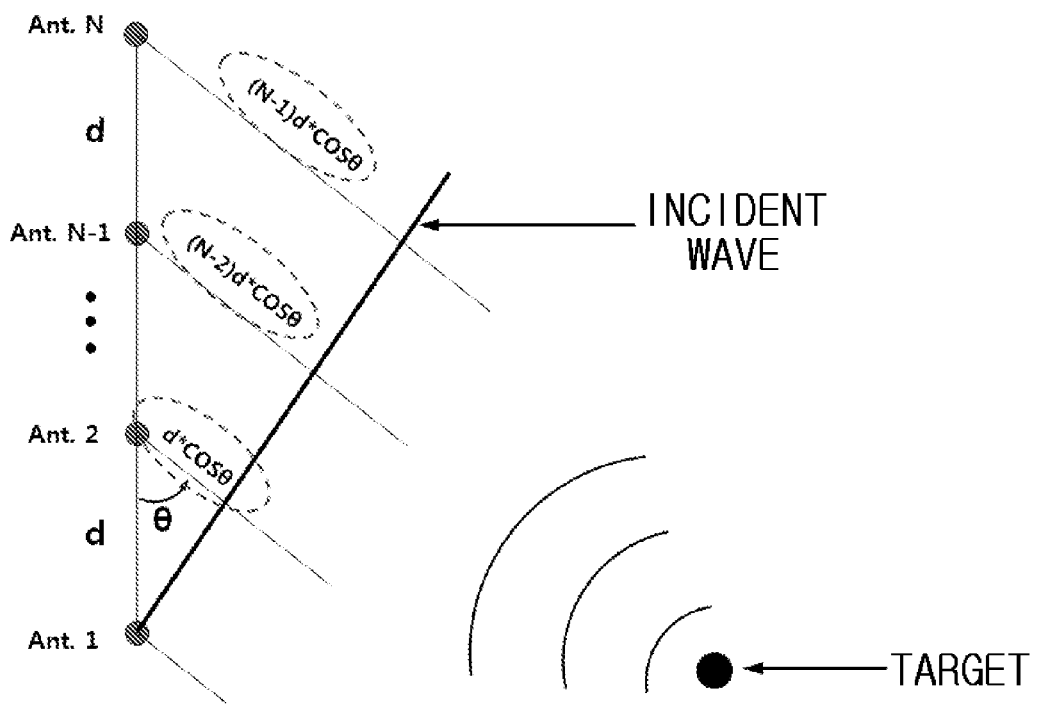
FIG. 3 is a diagram for describing a principle of detecting a vertical angle by the vertical angle detection unit of FIG. 1.

FIG. 3 is a diagram for describing a principle of detecting a vertical angle by the vertical angle detection unit of FIG. 1.

As illustrated in FIG. 3, the receiving antenna unit receives signals reflected from a predetermined target.

Next, the receiving antenna unit may calculate the phase values of the signals for each row which are received from the receiving antennas arranged in a matrix form and compare the calculated phase values of the signals for each row to calculate the phase differences for each row.

As illustrated in FIG. 3, radiowave receiving distance differences for each row may be represented by d*cos θ, ..., (N-2) d*cos θ, and (N-1)d*cos θ. Further, the phase differences for each row may be obtained based on the radiowave receiving distance difference for each row.

Therefore, the vertical angle may be easily detected based on the phase differences and as a result the vertical alignment may be automatically performed.

As such, the first exemplary embodiment of the present invention may arrange the antennas of the receiving antenna unit in horizontal and vertical directions to cause a phase delay in the horizontal direction and the vertical direction, thereby finding out the vertical angle of the target.

Figure 4:
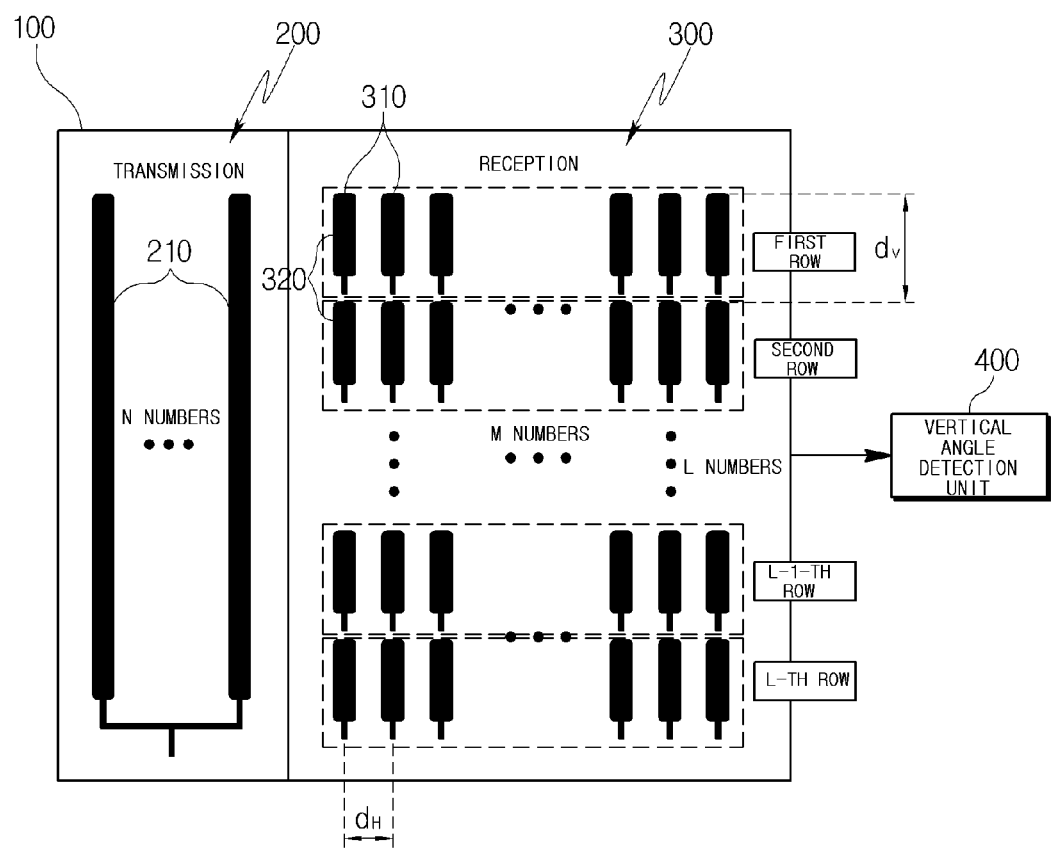
FIG. 4 is a plan view illustrating an apparatus for controlling an alignment of a vehicle radar according to a second exemplary embodiment of the present invention.

FIG. 4 is a plan view illustrating an apparatus for controlling an alignment of a vehicle radar according to a second exemplary embodiment of the present invention.

As illustrated in FIG. 4, the apparatus for controlling an alignment of a vehicle radar according to the second exemplary embodiment of the present invention may include the substrate 100, the transmitting antenna unit 200, the receiving antenna unit 300, and the vertical angle detection unit 400.

In this configuration, the transmitting antenna unit 200 may be disposed at one side of the substrate 100 and the receiving antenna unit 300 may be disposed at the other side of the substrate 100.

Further, the vertical angle detection unit 400 may detect the vertical angle of the target based on the signal received from the receiving antenna unit 300 to perform the vertical alignment.

Next, the receiving antenna unit 300 may include the plurality of first antennas 310 which are arranged in the row direction to the surface of the substrate 100 and the plurality of second antennas 320 arranged in the column direction to the surface of the substrate 100.

In this configuration, the first antennas 310 may be arranged in the row direction in parallel, having the first interval dH.

In this case, the first interval dH may mean the distance between the central axes of the first antennas adjacent to each other.

Further, the second antennas 320 may be arranged in the column direction in parallel, having the second interval dV.

In this case, the second interval dV may mean the distance between ends of sides of the second antennas adjacent to each other.

Depending on the method for forming an antenna radiation pattern, the first interval dH between the first antennas 310 and the second interval dV between the second antennas 320 may be different from each other. For example, the first interval dH between the first antennas 310 may be smaller than the second interval dV between the second antennas 320.

As another example, the first interval dH between the first antennas 310 and the second interval dV between the second antennas 320 may be equal to each other.

Further, the first antennas 310 may be arranged in each row in the same number.

For example, when the number of first antennas 310 in the first row is M numbers, the number of first antennas 310 in the rest other rows may be M numbers.

However, depending on the method for forming an antenna radiation pattern, when the number of first antennas 310 in the first row is M numbers, the number of first antennas 310 in the rest other rows may be more or smaller than M numbers.

Further, the second antennas 320 may be arranged in each column in the same number.

For example, when the number of second antennas 320 in the first column is L numbers, the number of second antennas 320 in the rest other columns may be L numbers.

However, depending on the method for forming an antenna radiation pattern, when the number of second antennas 320 in the first column is L numbers, the number of second antennas 320 in the rest other columns may be more or smaller than L numbers.

Meanwhile, the transmitting antenna unit 200 has the plurality of antennas 210 which may be arranged in the row direction to the surface of the substrate 100.

Here, the length of the antenna included in the transmitting antenna unit 200 may be larger than that of the first and second antennas 310 and 320 of the receiving antenna unit 300.

Further, the vertical angle detection unit 400 may calculate strengths of the signals, which are received from the receiving antenna unit 300, for each row to detect a row in which the strength of the signal is maximal and detect the vertical angle of the target from the detected row to perform the alignment.

Figure 5:
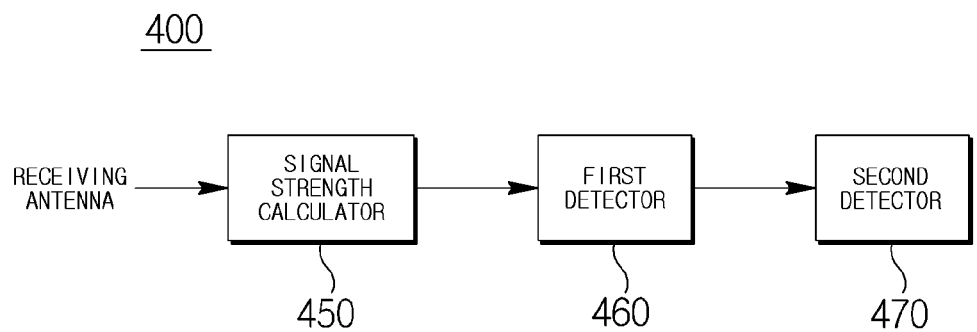
FIG. 5 is a block configuration diagram illustrating a vertical angle detection unit of FIG. 4.

FIG. 5 is a block configuration diagram illustrating the vertical angle detection unit of FIG. 4.

As illustrated in FIG. 5, the vertical angle detection unit 400 may include a signal strength calculator 450, a first detector 460, and a second detector 470.

In this configuration, the signal strength calculator 450 may calculate the strengths of the signals, which are received from the receiving antenna unit 300, for each row.

Further, the first detector 460 compares the strengths of the signals, which are calculated by the signal strength calculator 450, for each row to detect the row in which the strength of the signal is maximal.

Next, the second detector 470 may detect the vertical angle of the target based on the detected row.

The vertical angle detection unit of FIG. 4 calculates the strengths of the received signals for each row of the receiving antenna when receiving the signals reflected from the target.

Further, the vertical angle of the target may be detected based on the row in which the strength of the signal is maximal by comparing the strengths of the signals for each row, and as a result the vertical alignment may be automatically performed.

As such, the second exemplary embodiment of the present invention may arrange the antennas of the receiving antenna unit in the horizontal and vertical directions to cause the phase delay in the horizontal direction and the vertical direction, thereby finding out the vertical angle of the target.

Figure 6:
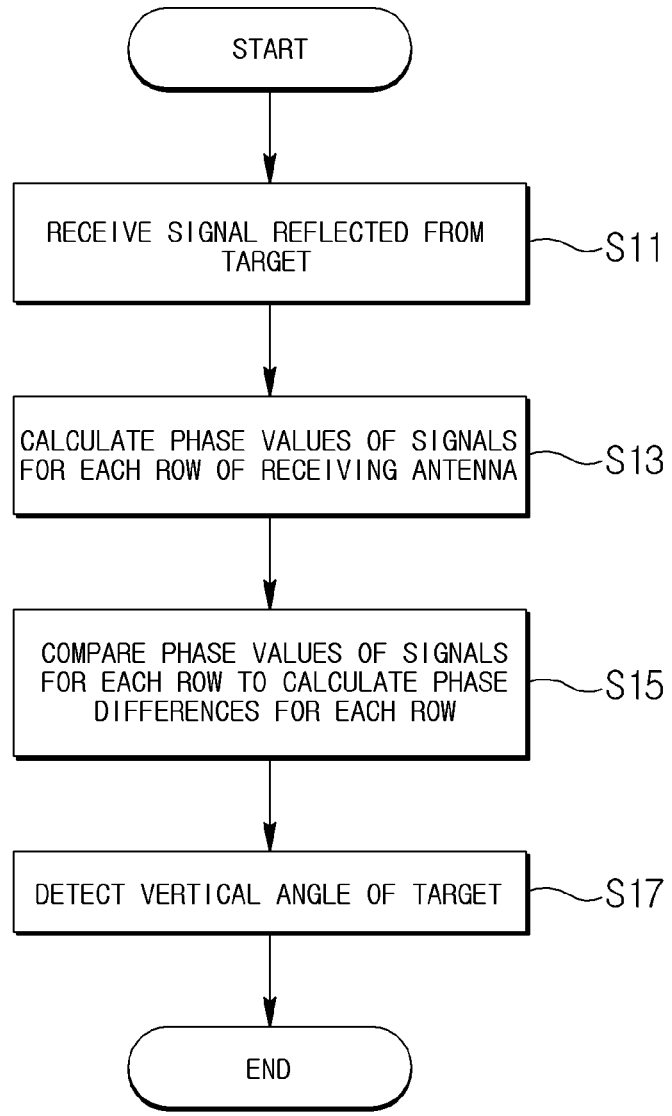
FIG. 6 is a flow chart for describing a method for controlling an alignment of a vehicle radar according to a first exemplary embodiment of the present invention.

FIG. 6 is a flow chart for describing a method for controlling an alignment of a vehicle radar according to a first exemplary embodiment of the present invention.

As illustrated in FIG. 6, the receiving antenna unit receives the signals reflected from the target (S11).

Further, the vertical angle detection unit calculates the phase values of the received signals for each row of the receiving antenna (S13).

Next, the vertical angle detection unit compares the calculated phase values of the signals for each row to calculate the phase differences for each row (S15).

Next, the vertical angle detection unit may detect the vertical angle of the target based on the calculated phase difference to perform the vertical alignment (S17).

The vertical angle detection unit according to the first exemplary embodiment of the present invention may calculate the phase values of the signals, which are received from the receiving antenna unit, for each row to obtain the phase differences for each row and detects the vertical angle of the target based on the phase differences to perform the alignment.

Figure 7:
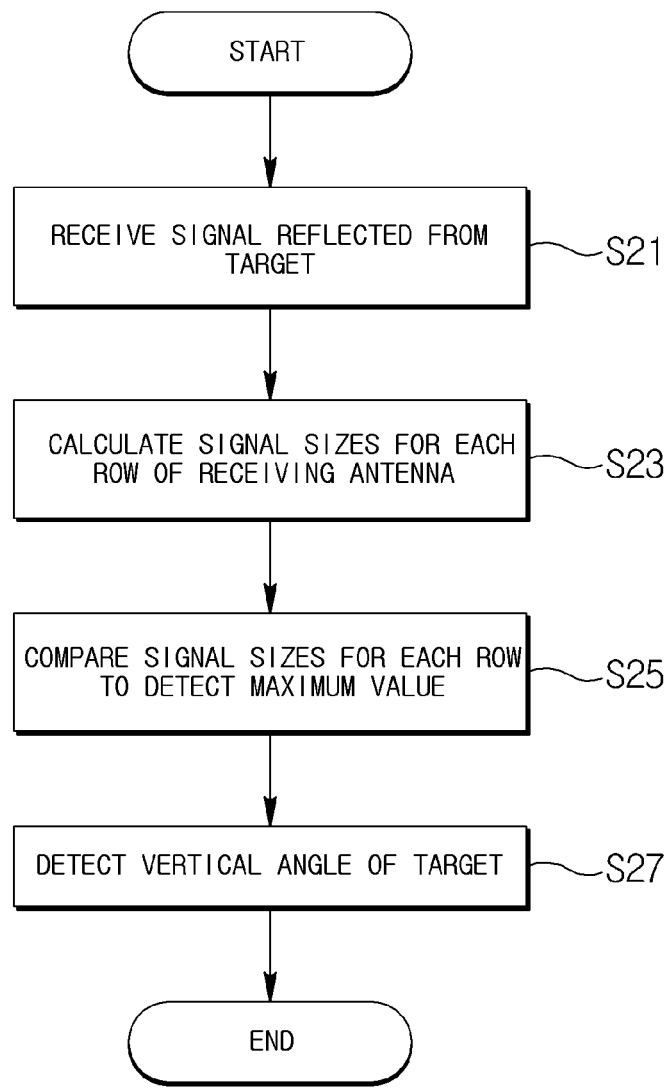
FIG. 7 is a flow chart for describing a method for controlling an alignment of a vehicle radar according to a second exemplary embodiment of the present invention.

FIG. 7 is a flow chart for describing a method for controlling an alignment of a vehicle radar according to a second exemplary embodiment of the present invention.

As illustrated in FIG. 7, the receiving antenna unit receives the signals reflected from the target (S21).

Further, the vertical angle detection unit calculates the strengths of the received signals for each row of the receiving antenna (S23).

Next, the vertical angle detection unit compares the calculated strengths of the signals for each row to detect the row in which the strength of the signal is maximal (S25).

Next, the vertical angle detection unit may detect the vertical angle of the target based on the detected row to perform the vertical alignment (S27).

The vertical angle detection unit according to the second exemplary embodiment of the present invention may calculate the strengths of the signals, which are received from the receiving antenna unit 300, for each row to detect the row in which the strength of the signal is maximal and detect the vertical angle of the target from the detected row to perform the alignment.

As such, the exemplary embodiment of the present invention may arrange the antennas of the receiving antenna unit in the horizontal and vertical directions to cause the phase delay in the horizontal direction and the vertical direction, to thereby find out the vertical angle of the target and compares signal sizes among rows to find out the vertical angle of the target.

As a result, according to the exemplary embodiment of the present invention, the vertical alignment may be automatically performed without the motor or the manual operation of the worker by automatically detecting the vertical angle of the target, thereby providing the accurate driving information and safely driving the vehicle.

According to the exemplary embodiments of the present invention, it is possible to provide the accurate driving information and safely drive the vehicle by automatically performing the vertical alignment without using the motor or the worker performing the manual operations, by vertically arranging the plurality of antennas in the vertical direction simultaneously with horizontally arranging the antennas in the horizontal direction to automatically detect the vertical angle of the target.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An apparatus for controlling an alignment of a vehicle radar, comprising:
   a substrate;
   a transmitting antenna unit configured to be disposed at one side of the substrate;
   a receiving antenna unit configured to be disposed at the other side of the substrate; and
   a vertical angle detection unit configured to detect a vertical angle of a target based on a signal received from the receiving antenna unit,
   wherein the receiving antenna unit includes:
   a plurality of first antennas configured to be arranged in a row direction to a surface of the substrate; and
   a plurality of second antennas configured to be arranged in a column direction to the surface of the substrate.

2. The apparatus of claim 1, wherein the first antennas are arranged in the row direction in parallel, having a first interval, and
   the second antennas are arranged in the column direction in parallel, having a second interval.

3. The apparatus of claim 2, wherein the first interval and the second interval are different from each other.

4. The apparatus of claim 1, wherein the first antennas are arranged in each row in the same number, and
   the second antennas are arranged in each column in the same number.

5. The apparatus of claim 1, wherein the vertical angle detection unit calculates phase values of signals, which are received from the receiving antenna unit, for each row to obtain phase differences for each row and detects the vertical angle of the target based on the phase differences.

6. The apparatus of claim 5, wherein the vertical angle detection unit includes:
   a phase value calculator configured to calculate the phase values of the signals, which are received from the receiving antenna unit, for each row;
   a phase difference calculator configured to compare the phase values of the signals for each row which are calculated by the phase value calculator to calculate the phase differences for each row; and
   a detector configured to detect the vertical angle of the target based on the phase differences for each row calculated by the phase difference calculator.

7. The apparatus of claim 1, wherein the vertical angle detection unit calculates strengths of signals, which are received from the receiving antenna unit, for each row to detect a row in which the strength of the signal is maximal and detects the vertical angle of the target based on the detected row.

8. The apparatus of claim 7, wherein the vertical angle detection unit includes:
   a signal strength calculator configured to calculate the strengths of the signals, which are received from the receiving antenna unit, for each row;
   a first detector configured to compare the strengths of the signals, which are calculated from the signal strength calculator, for each row to detect a row in which the strength of the signal is maximal; and a second detector configured to detect the vertical angle of the target based on the row detected by the first detector.

9. The apparatus of claim 1, wherein the transmitting antenna unit has a plurality of second antennas arranged in a row direction to the surface of the substrate.

10. The apparatus of claim 1, wherein a length of the antenna included in the transmitting antenna unit is larger than that of the first and second antennas of the receiving antenna unit.

11. The apparatus of claim 1, wherein the vertical angle detection unit simultaneously detects a horizontal angle and a vertical angle.

12. The apparatus of claim 1, wherein the vertical angle detection unit simultaneously measures the phase difference for each row and the strengths of the signals for each row to detect at least any one of the horizontal angle and the vertical angle.

13. A method for controlling an alignment of a vehicle radar including a receiving antenna unit in which a plurality of receiving antennas are arranged in a row direction and a column direction, the method comprising:

receiving signals reflected from a target;

calculating phase values of the received signals for each row of the receiving antenna;

comparing the calculated phase values of the signals for each row to calculate the phase differences for each row; and detecting a vertical angle of the target based on the calculated phase differences to perform a vertical alignment.

14. A method for controlling an alignment of a vehicle radar including a receiving antenna unit in which a plurality of receiving antennas are arranged in a row direction and a column direction, the method comprising:

receiving signals reflected from a target;

calculating strengths of the received signals for each row of the receiving antenna;

comparing the strengths of the calculated signals for each row to detect a row in which the strength of the signal is maximal, and detecting a vertical angle of the target based on the row in which the detected strength of the signal is maximal to perform a vertical alignment.

* * * * *